United States Patent
O'Brien

(12) 
(10) Patent No.: US 6,558,705 B2
(45) Date of Patent: May 6, 2003

(54) COMPOSITION FOR REDUCING EVAPORATION AT SITES BOTH ON LAND AND OPEN WATER

(76) Inventor: Robert Neville O'Brien, 2614 Queenswood Dr., Victoria B.C. (CA), V8N 1X5

( * ) Notice: Subject to any disclaimer, the term of this patent is extended or adjusted under 35 U.S.C. 154(b) by 0 days.

(21) Appl. No.: 09/739,895

(22) Filed: Dec. 20, 2000

(65) Prior Publication Data

US 2001/0022355 A1 Sep. 20, 2001

Related U.S. Application Data

(63) Continuation-in-part of application No. 09/192,298, filed on Nov. 17, 1998, now Pat. No. 6,303,133.

(51) Int. Cl.⁷ ............................................. A61K 9/14
(52) U.S. Cl. ..................... 424/489; 424/400; 422/42; 422/43; 252/194; 252/381; 252/383; 252/384; 509/169
(58) Field of Search ........................ 232/194; 424/400, 424/489; 422/42, 43; 509/162; 252/381, 383, 384

(56) References Cited

U.S. PATENT DOCUMENTS

| | | | |
|---|---|---|---|
| 3,205,059 A | 9/1965 | Roberts | 71/27 |
| 3,391,987 A | 7/1968 | Myers | 21/60.5 |
| 3,415,614 A | 12/1968 | Egani et al. | 21/60.5 |
| 3,446,571 A | 5/1969 | Oberholtzer | 21/60.5 |
| 3,450,488 A | 6/1969 | Dressler | 21/60.5 |
| 3,980,490 A | 9/1976 | Schneider | 106/287.17 |
| 4,172,058 A | 10/1979 | Hall | 260/170.4 |
| 4,250,140 A | 2/1981 | Rowlette | 422/43 |

OTHER PUBLICATIONS

"Reducing Water Vapor Transport with Monolayers", W.J. Roberts; *Retardation of Evaporation by Monolayers* (1962) V.K.Lamer, ed; pp. 193–201.

"The Effect of Surface Active Compounds on the Suppression of Water Evaporation from Soils," P.D. Mistry, M.E. Bloodworth; Publ 62 *International Journal of Scientific Hydrology* (1963) pp 59–71.

"Some Effects of Emulsified Hexa–Octadecahol on Germination Establishiment and Growth of Kentucky Bluegrass", P.R. Attsatt, L.C. Bliss; *Agronomy Journal* v 55 (1963); pp. 533–537.

Primary Examiner—Thurman K. Page
Assistant Examiner—Lakshmi Channavajjala

(57) ABSTRACT

Parent disclosure, now U.S. Pat. No. 6,303,133 B1, taught a calcium hydroxide containing evaporation retardant having particles that mutually repel one another because of water-induced ionization. Calcium hydroxide makes the retardant unsuitable for treating overly alkaline agricultural soil, and to substitute plain calcium sulfate for calcium hydroxide would degrade the particle repulsion effect. Substitutable acidified gypsum is made by absorbing about 5 milliliters sulfuric acid per 300 grams calcium sulfate. Blending unemulsified detergent range alcohol in a parts by weight ratio of about one-to-ten with the acidified gypsum produces a soil treatment product for suppressing evaporation of water from treated soil without impairing water infiltration into the same soil.

5 Claims, No Drawings

COMPOSITION FOR REDUCING EVAPORATION AT SITES BOTH ON LAND AND OPEN WATER

CROSS-REFERENCE TO RELATED APPLICATION

This non-provisional patent application is a continuation-in-part of my application Ser. No. 09/192,298 filed Nov. 17, 1998 now U.S. Pat. No. 6,303,133, for a "Composition for Reducing Evaporation", incorporated herein by reference.

BACKGROUND OF THE INVENTION

1. Technical Field

The field of the present invention is that of water conservation measures effected using evaporation suppressant chemicals at sites including open water reservoirs and agricultural land. For effecting such measures, this invention relates more particularly to a composition comprising a blend of an inorganic constituent, selected as described hereinafter, with one or more of the higher fatty alcohols, also called alkanols, which have upwards from 12 carbon atoms per molecule. The higher fatty alcohols of use in the blend I disclose are saturated straight-chain aliphatic hydrocarbons within a range whereby in commerce they are designated "detergent range alcohols".

For clarity as to the nature and field of my invention: the blending of specified constituents which I disclose is clearly unrelated to any special catalytic or any other chemical reaction-involving process for the chemical derivation and production of the higher fatty alcohols themselves, nor do I propose any chemical reaction between constituents of my blend, since none occurs when practicing my method of manufacturing that blend.

2. Prior Art

Scientific literature and patents have conveyed to those of ordinary knowledge in the field of water conservation both suggestions (a.) to apply higher fatty alcohols or compositions containing them to open water sites, and suggestions (b.) to apply higher fatty alcohols or compositions containing them to agricultural land. Increased public concern with prospects of global warming which might bring more drought than usual to some regions lends urgency to need for simplified attainment of civil preparedness for drought by large-scale manufacture and stockpiling of a composition that is effective for water conservation at both kinds of application sites, One early art practitioner, W. J. Roberts, whose work for the Illinois State Water Survey Division is well known, pointed in the direction of using the same higher fatty alcohol on either open water or agricultural land.

U.S. Pat. No. 7,205,059 to W. J. Roberts (Sep. 7, 1965) teaches that "where desired the alcohol may be applied to the soil in powdered or flake form,". Previously, regarding application to water, the same substance in the same form had been spread by Roberts on Crystal Lake in Illinois, to forestall drying up of the lake during the summer of 1957, as reported in "Reducing Water vapor Transport with Mornolayers", W. J. Roberts. pp. 193–201 in *RETARDATION OF EVAPORATION BY MONOLAYERS*, V. R. La Mer, ed., Academic Prsss (1962). Regarding application to land of "tallow alcohols" such as hexadecanol and octadecanol, the Roberts patent conveys a concept respecting reduction of plant transpiration; however, I believe that, from the literal suggestion to apply powdered or flaked tallow alcohol to soil, workers of ordinary knowledge in the field today would expect that, aside from possible plant transpiration reduction, water evaporation from the soil itself likely could also be reduced by executinr the sulestiorn. Guidance in doing so need not be derivative from the Roberts patent but could rely on any and all pertinent information emergent in the past thirty-five years, supplemented by results of easily conducted experiments. One matter of guidance which I consider could be arrived at without excessive experiment is the particular amount of applied higher fatty alcohol content per acre that would be effective to conserve water in given site conditions.

Another early art practitioner, R. D. Dressler, also recognized that higher fatty alcohol blends may be applied on either open water or alricultural land.

U.S. Pat. No. 3,450,488 to R. G. Dressler (Jun. 17, 1969) specifically mentions applications of higher fatty alcohol blends both "to surfaces of Large bodies of open water" and "on damp or moist soil in which plants are growing". Alternative methods for distribution of the blends of Dressler are reviewed in the context of the first-quoted "most important" application. Identified functional categories of optional blend additives, ie., additives aside from the fatty alcohol homologs of essential concern in this Dressler patent, include: "diluents", "adduct" forgers, "solvents", "dispersants", "emulsifiers", "surfactants", and "anti-caking agents".

It is evident that the field encompasses a host of possible blends.

Some particular blends might lend themselves to use on both open water and agricultural land, whilst others might not. Since the Roberts patent mentioned "peat moss or mulch" as possible blending materials in context of an on-land application, it is rational to then consider factors pertinent to their possible use in an open water context. For example, mulches ordinarily possess a certain property of longevity respecting resistance to major structural deterioration upon exposure to water. A mulch cannot function through a reasonably large number of alternate wetting and drying cycles on land if it lacks such longevity, as it would if it dissolved when becoming wet. It may be noted here that the term "mulch" in the Roberts patent is inconclusive on whether an organic or else inorganic material is intended. Inorganic materials such as sand and vermiculite have utility as mulches.

U.S. Pat. No. 3,446,571 to A. V. Oberholtzer (May 27, 1969) teaches impregnation of higher fatty alcohols into "porous inert solids materials" having an "adsorbent or absorbent" character, The "vermiculite", "earth materials", and even "dirt", which are mentioned are inorganic. Sand is not specifically mentioned but would likely come to mind when thinking of earth materials and dirt. Because cellulosic materials, eg., "ground up stems and leaves", are also suggested in the Oberholtzer patent, like that of Roberts it fails to specify a preference as between organic and inorganic blending constituents. The Oberholtzer patent suggests distribution of the disclosed blends on collected water bodies, but one easily notes similarity of certain of the suggested blends to a blend of mulch and higher fatty alcohol. Thus, in view of the suggestion in the Roberts patent that a blend of mulch and higher fatty alcohol may be applied to soil, the supposition may reasonably be entertained that those of ordinary knowledge in the field today might perceive that many if not all of Oberholtzer's suggested blends may be susceptible to advantageous distribution on land as well as on water.

U.S. Pat. No. 4,172,058 to J. M. Hall (Oct. 23, 1979), incorporating by reference the abovecited Roberts patent which mentioned "mulch", discloses a composition comprising a blend of higher fatty alcohol with an "absorbent material", where specified uses include application to land for the purpose of increasing retention of soil moisture. Thus, in view of the Oberholtzer patent, the supposition may reasonably be entertained that those of ordinary knowledge in the field today might perceive that the composition of Hall may be susceptible to advantageous distribution on water as well as on land.

Probably a number of other higher fatty alcohol containing compositions, suggested by their respective inventors specifically for suppression of evaporation from open water surfaces, might be perceived by workers of ordinary knowledye in the field today as possibly distributable on land, including compositions known from three patents next identified, each of which, in common with the others, as well as with the Oberholtzer patent, mentions that the higher fatty alcohol constituent may be melted in order to facilitate blending with another constituent.

U.S. Pat. No. 3,391,987 to L. E. Myers (Jul. 9, 1968) discloses manufacture of a composition by melting a higher fatty alcohol and blending the same with a "matrix" or ",carrier" selected from water-soluble saccharides. Regarding molded blocks of the comnposition intended for siting underwater and which require a density greater than that of water, the Myers patent states: "Where greater density is desired a dense material such as powdered calcium or barium sulphate, ground rock, sand, etc. may be incorporated in the composition."

U.S. Pat. No. 3,415,614 to R. R. Elan and S. R. Sheeran (Dec. 10, 1968) discloses manufacture of a composition which "floats on water" by melting a higher fatty alcohol and blending the same with a "spreading agent" selected from water-miscible liquid heterocyclic compounds such as tetrahydrofuran and tetrahydrofurfural alcohol.

U.S. Pat. No. 4,250,140 to J. J. Rowlette (Feb. 10, 1981) discloses manufacture of a composition by melting a higher fatty alcohol and blending the same with water soluble polyethylene glycol, preferably grinding the cooled result, then admixing the same with a "filler" material selected for capability of "gIenerating a gas upon contact with water", eg., sodium bi-carbonate.

Unlike the specified organic blending material in the Hall patent, all essential materials specified for blending with a higher fatty alcohol in the foregoing three patents intentionally lack the longevity of a mulch.

I have not located, in the field of water conservation involving use of blended compositions containing higher fatty alcohols, whether for application to land or open water, any clearly equivalent blend to that which I hereinafter disclose.

However, from U.S. Pat. No. 3,980,490 to G. L. Schneider (Sep. 14, 1976), which I regard as a patent from outside the field of my invention, there is suggestion of a "soil stabilizing agent" that can be made by a proposed chemical reaction that involves a source of calcium, irncluding calcium hydroxide or calcium sulfate, plus a source of sulfuric acid, plus water, and plus—optionally—a hydrocarbon material selected from eight itemized "oils" ranked by Schreider in descending order of preference from "(1) kerosene" to "(8) residual fuel oil or asphalt". I note that the least preferred optional hydrocarbon is the one closest in general character to the higher fatty alcohols, not expressly mentioned.

What the Schneider patent teaches regarding functions of the "reaction product" it discloses appears incompatible with water conservation at a site of land intended for normal agricultural crop-growing. As a "stabilizing agent" added to soils, the Schneider "reaction product" serves inventive objects with functions: (a.) "to reduce the speed with which moisture leaves during periods of dehydration"; and (b.) "to restrict the speed with which if water enters the structure of such soils during periods of wet weather".

Incompatibility of the (b.) function with a leading principle with which workers of ordinary knowledge in the field of Tmy invention are acquainted is demonstrable by reference to a statement—clearly in a context of seeking benefit to agriculture by applying evaporation suppressants to soil—that warns away from adding to soil, together with an evaporation suppressant, an agent that impairs water infiltration. This statement is by F. D. Mistry and M. E. Bloodworth in Publ. No. 62 of the *international Association of Scientific Hydrolory* (1963), at p. 61: "The use of chemical copounds in reducing evaporation, from a practical standpoint, will be ineffective if water infiltration is impaired." Restriction of speed of entry of water into soil by the Schneider "reaction product", ie., "soil stabilization agent", is the same thing as impairing water infiltration. Thus, it is likely that workers of ordinary knowledge in the field of my invention would dismiss out-of-hand the Schneider invention as inapplicable to procuring the benefit to agriculture they seek.

Aside from which, while granting that the Schneider invention suppresses evaporation from underlying treated soil by providing a water-resistant top layer, it strains credulity to suppose that easily conceived departures from the Schneider invention would render it advantageously applied to an open water surface. The closer-in-art patents cited above, but not the Schneider patent, would sustain attention of someone of ordinary knowledge in my invention's field.

A supposition has been above entertained that certain patents disclosing evaporation suppressant compositions for application to open water warrant being looked to for compositions of possible applicability to agricultural land, and vice versa. This supposition, however, does not affirm that any of the specific blends respectively proposed in the patents of Oberholtzer, Hall, Myers, Egan et al, and Rowlette would necessarily prove effective if transposed, in application from the one type of site described, to the other, unuescribed. Of all the patents I have cited, only ore explicitly suggests applicability of a disclosed blend both to open water and agricultural land, viz., that of Dressler, which also is the one mentioning the largest number of optional methods of application and composition additives.

A respect in which I regard the whole field of prior art to be generally deficient is paucity of information on whether normally designated specific functions of given constituents remain effective in the case of transposed application siting. For example, the Dressler patent mentions, on the one hand, possible use with the disclosed composition of "emulsifiers such as nonionic or anionic organic surfactants", and, on the other hand, using the composition for application on "snow fields". I doubt that ordinary workers in the art would comfortably accept from these bare suggestions of Dressler that the surfactants mentioned retain similar emulsifying effect in higher fatty alcohol blends placed on snow, that they have in blends on open water. As another example, a somewhat difficult experiment might be needed, to verify what, if any, useful effect of underground gas fizzing attends possible burial in moist dirt of a sodium bi-carbonate containing composition of Rowlette, which when 'buried' underwater has—for the soda—functions of first breaking off from a submerged tablet a fatty alcohol containing particle, and then of hastening its dispersal aloft to the water surface.

My opinion is that equivalent utility-functions for the same substances are not properly viewed as 'inherent' when application sites which are in major respects different from one another are proposed.

Therefore, in my disclosure to follow of a novel water-saving blend that is peculiarly well adapted to use both on open water and agricultural land, not the least aspect of my contribution to advance of the art may be that T expressly include indications of where functions of my proposed constituents remain the same, and where not.

BRIEF SUMMARY OF THE INVENTION

A major object of this invention is to simplify the task of those who are responsible for civil preparedness in prospect of droughts, by providing instruction how to make and use a single water-saving composition which is peculiarly well adapted both for application to agricultural land, and for application to open water surfaces of reservoirs storing water in bulk. By "agricultural land" I mean to include soil plots intended for normal crop growth both before and after establishment thereon of the crop.

Another object of the invention is to provide a versatile water-saving composition that is easily distributable at the two kinds of contemplated application sites, using a variety of distribution techniques and uncomplicated equipment.

Further objects, including suggestions how to meet certain technical challenges and procure several advantages as detailed further below, will become apparent as disclosure of the invention proceeds.

Searching for a composition of peculiarly well adapted character respecting both kinds of contemplated application sites began in awareness that two of the larger tonnage inorganic substances in normal supply to current agriculture are lime and gypsum. The latter, as calcium sulphate, was mentioned in the prior art evaporation retardant of Rowlette, where its use was suggested for provision of weight to submerged tablets. For reasons explained further below, plain gypsum is unsuitable for use in the higher fatty alcohol containing blend I disclose.

From extensive experimentation conducted in secrecy, I have discovered that about one part by weight of a constituent comprising one or more higher fatty alcohols having upwards from 12 carbon atoms per molecule should be admixed while in the liquid-phase acquired by melting with about ten parts by weight of either pre-powdered slaked agricultural lime, or alternatively, finely crushed gypsum into which sulfuric acid has previously been mixed in approximately a ratio equivalent to 5 milliliters per 300 grams. Hereinafter I will sometimes call the specially made gypsum containing constituent "acidified gypsum".

Which of the two alternative non-alcohol constituents proposed should be selected for a particular batch of composition, or which of the two embodiments of the invention should be used or stockpiled in a certain region, depends in a simple manner upon the pH requirements of intended sites of application. A site which would benefit more from an alkaline treatment receives the lime-containinq blend, and a site which would benefit more from an acidic treatment receives the blend that contains the acidified gypsum.

The most important function of sulfuric acid in the acidified gypsum is not, however, the function of providing a blend constituent making the blend suitable for application to a site benefitting from an acidifying treatment. Gypsum which has not been pre-treated using sulfuric acid is not suitable for direct substitution in place of slaked agricultural lime as the calcium containing constituent of a water-saving composition in accordance with my invention.

Briefly explained, the unsuitability of plain calcium sulfate into which sulfuric acid has not been pre-mixed relates to a unique manner of promoting dispersal apart from one another of individual particulate aggregations of the calcium hydroxide containing original embodiment of the invention. In contact with water, the lime portion of each such aggregation commences dissolving with release of hydroxyl ions that diffuse much faster than calcium ions. This differential of ionic celerities results in acquisition by individual particulate aggregations of like charges, producing their mutual repulsion on or in water. Readily appreciated advantages resulting from this novel mechanism include: enhancement of film spreading on a water surface; and reduction of apparent viscosity for possible water suspensions and slurries distributable either on open water or land surfaces. The kind of 'imbalanced' release of ions involved is unsuggested in the prior art.

I doubt that the problem of unsuitability of plain gypsum as a substitute for lime in my composition would even be raised as a problem in the mind of anyone unfamiliar both with the aforesaid charge acquisition mechanism and with my invention in its original slaked lime containing embodiment. Once recognized though, I found the problem resolvable by using sulfuric acid to overcome deficiency of slow-dissolving plain gypsum at providing effective extent of imbalanced ion diffusion rates, Particulate aggregations containing acidified gypsum particles adherent to higher fatty alcohol constituents perform similarly as the lime containing aggregations and are produced in accordance with the same processing conditions.

The temperature of the higher fatty alcohol melt during blend manufacture should be from about 90° C. to 120° C. until thorough mixing of constituents in the already indicated ratios is achieved. A cooling step follows in which the temperature of the blend is lowered to at least 30° C.

The resulting composition in either of its two embodiments may, due to uneven stirring events, contain lumpy pieces which are readily reduced by any known means to provide a non-lumpy reasonably fluent particulate consistency. Acceptable cross-sectional dimensions of the irregularly shaped individual particulate aggregations produced range between about 10 and 300 microns. The finished product is a powdery composition which is easily distributed in dry form upon both land and water surfaces by any known powder distribution technique, such as uses blowers, agricultural dusters, agitated gravity-fed powder dispensers and hoppers, etc. If water, water pumping, and piping means are available, it is feasible to make a suspension or slurry adapted to distribution of the composition in manners known in the art for suspensions and/or slurries. My invention obviates need for costly emulsifying agents to prevent equipment clogging, because the composition aggregations repel one another when in water. I also wish to avoid use of emulsified higher fatty alcohol in compositions applied to land, for a reason brought out further below, concerning water infiltration.

Extended droughts could bring periods of scarcity of higher fatty alcohol and water supplies, when distribution of minimal dry blended higher fatty alcohol content per acre upon land sites is indicated, in which case an expedient not of the essence of the invention, but helpful, is to dilute the the particulate composition of the invention with a larger quantity of cheap non-reactive material such as sand, or even dry earth materials available in a drought-stricken vicinity. Using inorganic rather than organic substances as non-alcohol blending constituents of a water-saving composition is also attuned to a prospect of drought of extended duration, when organic materials used in certain prior art compositions, eg., the saccharides of Myers, furans of Egan et al made from oats, and starch in Hall's invention may become scarce, making it better to reserve sugar, oats, and starch supplies for feeding the drought-affected human population, since these substances are not essential for conservation of water.

A description of the present invention follows in detail with special attention to technical challenges met, and discloses how the proposed blend made and used as already described manifests certain technical function changes in divergent circumstances. Precaution regarding inadvertent emulsification is also addressed.

DETAILED DESCRIPTION OF THE INVENTION

Either one of the two powdery evaporation suppressant compositions which embody the invention essentially consists of ten parts by weight of selected inorganic constituent containing an ionic compound and one part by weight of an unemulsified higher fatty alcohol constituent present in an amorphous low lattice energy form. As already adequately described above, the inorganic constituent is selected from respectively alkaline and acidic alternatives comprising calcium hydroxide, and calcium sulfate to which sulfuric acid has been added.

Neither of these alternative blending constituents has a property of longevity comparable to that of inorganic mulching materials such as sand and vermiculite, but for reason of its slower dissolution in water than lime, gypsum particles remaining undissolved after sulfuric acid has ionized and escaped therefrom would possess a slight degree of such longevity. This draws attention to my selection of lime-based and of gypsum-based blending constituents as not merely guided by extent of en masse dissolvability per se, where "dissolvability" would normally be taken as meaning structural deterioration by exposure to water without necessarily referring to complete At ionization of an included compound, let alone to my specified mode of imbalanced ionization characterized by release of ions of one sign—positive or negative—which diffuse approximately from 5 to 7 times faster than counter-part ions of opposite charge sign in the ionic compound. Looking in detail at the action of water on the inorganic constituent of my composition, two results of penetrating water occur: 1. the intendedly imbalanced special mode of ionization of a compound present in the selected inorganic blending constituent; and 2. a substantially unavoidable erosionlike structural deterioration of individual particulate aggregations of composition constituents. The two results of penetrating water are technically distinct, and the second one (2. just above) cannot help but to some extent limit the magnitude of composition effectiveness attained in relation to the first (1.), which procures the mobility-enhancing charges for individual particulate aggregations so that they will tend to mutually repel one another.

For clarity: quantities of ionizable compound which due to erosive water action physically separate from the higher fatty alcohol before completed ionization will complete their ionization in water without contributing to the desired charge-procuring effect whereby aggregations still containing all blend constituents in contact with one another are mutually repelled. This is one reason why the specified ratios of constituents I disclose are believed to be exceedingly important, since structural deterioration of aggregations by action of water has been found by experimentation to not too deleteriously race ahead of the like charges procuring mechanism, which is only effective on individual particulate aggregrations so long as at least some ionic compound remains in adherent connection with the higher fatty alcohol constituent.

The imbalanced ion-releasing mechanism manifests itself as operative in more than one way to accomplish abovestated objects of the invention, the composition having to meet two sets of technical challenges which correspond to the two kinds of application sites, agricultural land and open water. In meeting those challenges, effective functions of included constituents are not always the same for challenges from the one set as in the other case.

With regard to application siting on open water and corresponding technical challenges relating thereto, 1. how to promote fast film spreading; and 2. how to form on water a film with a superior degree of self-repairing capability in adverse circumstances of wind and waves, are extensively dealt with in my co-pending patent application Ser. No. 09/192,298 filed as indicated above and which, if policy permits, is preferably incorporated herein by reference. The SUMMARY and the DETAILED DESCRIPTION portions thereof are the portions dealing with particular problems the present invention resolves in an equivalent if not identical manner, primarily by means of the mutually repulsive effect procured for individual particulate aggregations of the composition, complemented by enhanced film-spreading capability of an amorphous form of the higher fatty alcohol constituent.

Especially warranting detailed description and explanation in the present disclosure is how the invention meets two technical challenges with regard to application siting on agricultural land, namely: 1. how to provide an evaporation suppressant composition that can be applied to the land without impairing infiltration of water into the soil of the land; and, 2. how to provide a composition which procures benefit to agricultural land whether the mode of distribution onto the site involves injection of the composition into an irrigation water system, involving suspension or slurry formation, or else does not, and instead applies the composition in dry form.

Here is where, as promised above, I point out when a specific function of a composition constituent may become operative in one application in a way substantially diverging from how it functions in another application.

Dealing with land-siting technical challenge 2. above, when composition in accordance with the present invention is introduced to piped irrigation water of conventional systems, including sprinkling systems, this is when the mutually repulsion of individual particulate aggregations does not function similarly as when the composition is placed in initially dry form upon either open water or upon agricultural land. It of course matters not the least respecting ionization of an ionic compound in the aggregations, whether the water contacted is at the surface of a lake, from a raindrop falling onto land, from condensing dew, or in a pumping and piping system. The ionic compound ionizes into its oppositely signed ions in all those cases. In the pumping and piping case, however, although potential problems of equipment clogging will be substantially mitigated, this occurs at the expense of intending the ionization mechanism to be available at the surface upon which the composition is delivered.

Convenience of distributing the composition diluted in water suspension or slurry form can in non-urgent on-land applications such as watering a turf farm outweigh desirability of postponing ionization completion to the last possible moment.

When irrigation water is not employed for distribution of the composition and it is distributed in dry form upon a dry soil surface, this is where the ionization mechanism is preserved in readiness for effective function whenever rain or irrigation eventually brings water into contact with powder lying at the site. In this case, before contact by water the composition contributes to transient evaporation reduction as a dry mulch, unrelated to film formation and the ionizable feature, merely because additional material is added to an already naturally occurring dry diffusion barrier layer of topsoil. Distribution with added sand boosts the dry mulch contribution.

The most formidable of all technical challenges met by the invention is thought to be the first (1.) above with regard to land siting, viz., how to provide an evaporation suppressant composition that can be applied to the land without impairing infiltration of water into the soil of the land. In this case again the effective function of the in-built ionization mechanism diverges from how the mechanism operates on open water. To appreciate the divergence, one may commence with the odd query why typical landplastering, or ie., soil stabilizing substances including crushed lime or gypsum would not function as stabilizers as on land when applied to the surface., say, of a lake. The answer is absence at the surface of the lake of a porous air filled layer of soil particles with which landplastering substances are known to react in presence of water when mixed to some depth into the soil.

Workers in the art of stabilizing soils, such as Schneider cited above, find lime and/or gypsum constituents quite useful when the object is soil stabilization without a corollary object of maintaining a high water infiltration rate for the stabilized soil. By selecting lime- and gypsum-based constituents for inclusion in my composition I ran a risk of impairing water infiltration. Fortuitously, insofar as I can tell from experimental uses thus far, the cementation effect on soil particles that typically occurs when using lime and gypsum as landplasters is substantially avoidable by appliers to agricultural land of my blended composition, so long as my disclosed specification of about one part by weight of higher fatty alcohol blended in the conditions specified with about ten parts by weight of one or the other of the selected inorganic constituents containing ionic compound is followed, in which case the higher fatty alcohol will be in an unemulsified and amorphous form. I believe that if the higher fatty alcohol constituent were crystalline rather than amorphous, higher lattice energy would make it less likely to have an anti-cementation effect on adjacent soil particles contacted by wet lime or gypsum. Further, I believe that if the higher fatty alcohol constituent were emulsified, as is optional asphaltic materials in the invention of Schneider, this too would be deleterious to water infiltration rate. For a known teaching of science squarely in the field of my invention, and concerning where an emulsion of higher fatty alcohol had been applied to land in preference to a powdered or flaked form, but proved deleterious to water infiltration rate, refer to P. R. Atsatt and L. C. Bliss in "Some Effects of Emulsified Hexa-Octadecanol on Germination, Establishment, and Growth of Kentucky Bluegrass", *Agronomy Journal* v. 55 (1963) pp. 533–537, who state at p. 535: "In the same manner that the emulsion forms a barrier at the soil-air interface, it also retards re-entry of water."

The technical risk I faced by selecting constituents for blending as I did was high, both because the landplastering cementation effect of limes and gypsums had to be avoided, and because my blending process had to avoid inadvertent emulsification of the higher fatty alcohol content of the blend. To continue beating such risks I strongly advise all who would wish to make the acidified gypsum version of my invention to take special care to keep water and soil particles out of any containers in which the composition is manufactured, and of course to substantially follow my above teachings with regard to constituent ratios and processing conditions. Risk of inadvertent manufacture of some kind of reaction product like that of the Schneider patent does not occur in making the lime-based version of my invention which contains no sulfuric acid. Neither embodiment, incidentally, is intended for production on-site by mechanically stirring blend constituents together with water into a substantial depth of soil. Both embodiments are preferably manufactured and packaged off-site, then stockpiled in large quantities for use when needed.

Microscopic investigation of particulate aggregations of the composition prepared as directed reveals the higher fatty alcohol content to be both unemulsified and dispersed in an amorphous form as small beadlets and veinlets serving a glueing function joining several inorganic constituent particles both to one another and to the higher fatty alcohol. Besides a more effective service in this glueing role than would be expected if the higher fatty alcohol were in one of the crystalline forms in which it sometimes occurs, a consequence of considerable importance that was mentioned in the referenced patent application is that because of a lesser degree of stabilizing lattice energy in the amorphous form than in crystalline forms, the higher fatty alcohol will manifest an initially higher spreading rate during film formation on water. This effect is distinct from but complementary to mutual repulsion of particulate aggregations as the ionic compound thereto adheded ionizess in contact with water at a surface of water.

However, in a pipe completely filled with water in turbulent flow and conveying the composition in diluted suspension for some considerable distance before distribution onto agricultural land, as is feasible, it is clearly inapropos to speak of film spreading enhanced by the above-described ionic release mechanism. There exists in such a pipe no interface with air where the well known typical films of higher fatty alcohols can form. I suggest that a partially filled pipe would be of advantage to use in some conceivable applications, for example where it may be desired to lay a film down on a surface, not by sprinkling from a filled pipe, but by either drawing a mobile discharge head, itself not vertically filled and perhaps fan-shaped, across a smoothed soil surface, or alternatively, where trays of smoothed soil are treated, by moving the trays relative to a fixed discharging head. A pre-formed film could be gently laid onto the surface. It must be understood, however, that I do not propose that it is vital to conserving water at a land site when applying evaporation suppressant composition made in accordance with my invention. that a continuous film of higher fatty alcohol be formed.

Athough not indissolubly wed to any particular theory, I am in basic agreement with the many authorities in the portion of the field of the present invention pertaining to treatment of agricultural soils who suggest that evaporation suppression may ensue in a number of different ways independently of the manner of film formation typical on open water surfaces, for example by modifying topsoil properties so that a more effective than usual diffusion barrier is produced, and in some cases by reducing plant transpiration. My use of the term "agricultural land" throughout in this disclosure is meant to include both bare soil intended for crop growing and soil upon which vegetative growth may be already present.

Although sprinkling a diluted suspension of my composition onto agricultural land, together with water drops shot through the air from a sprinkler head of any kind, would not be expected to evenly lay down a continuous evaporation retarding film, by nonetheless causing either a modification of any soil reached and/or by causing reduced plant transpiration, that method of distribution would be expected to assist conservation of moisture in the land, much in the manners of either the proposals of Hall or of Roberts in relevant abovecited patents. Respecting the Hall citation, I note that any small absorbent soil clod receiving a 'hit' by a drop of water conveying my composition would afterwards perform basically like the higher fatty alcohol treated absorbent particles described in the Hall patent.

Further addressing possible distribution through filled water pipes., as by injection of a suspension form of my composition into a conventional sprinkler system, this clearly cannot be expected to preserve essentially the same function of mutually repelled aggregations as when the composition is distributed in a dry form. The function served in such water-borne distribution is prevention of equipment clogging by reduction of apparent viscosity, trading off convenient distribution for less prospect of effecting mutual repulsion of individual particulate aggregations after arrival onto the agricultural land. To some extent, a degree of that lost prospect caused by ionization during transport in pipes can be reduced by limiting the distance of filled-pipe pumping and/or by pumping as quickly as proves practicable without turbulence causing excessive erosive break-up of the aggregations. The optimal pressures for pumping could be found by simple experiments. Simultaneous watering and composition distribution could also be effected using mobile equipment to apply a suspension immediately after its onboard production, in which case using water as a conveying vehicle for the short vertical distance from moving equipment to the land is much less problematic than pumping for substantial distances through filled pipes.

In a typically very arid circumstance when use of the composition at a land site still retaining some subsurface moisture is most needed, water is apt not to be available for use as means of suspension forming and wet distribution techniques. The best mode of application contemplated therefore is broadcasting the composition in its as-manufactured form as a dry powder. Even though a film will not form in absence of water, effectiveness of the Ad dry diffusion layer of topsoil is supplemented by the added dry material of the composition, and when rain or irrigation eventually does come, desirable soil modification without the impairment of water infiltration associated with emulsions and typical soil cementation effects of landplasters will then proceed.

I have already established by experimental dusting of the original lime containing embodiment of my invention onto turf of a commercial sod growing operation that, when less moisture than would ideally be available for grass growth is present, grass treated by such dusting of turf remains green and healthier longer than grass of undusted turf to which the same less than ideal quantity of moisture is available.

Candidly, I do not know whether much, if any, or how much of the higher fatty alcohol content of powder fallen from grass blades firstly reaches the soil, secondly reaches the root zone, and then thirdly possibly enters the "organal system" of plants referred to thirty-five years ago by W. J. Roberts in the abovecited transpiration related patent. One or more of those successive three events perhaps does not occur; nevertheless the experiment proved that a favourable result entailing better use of water is procured.

Materials mentioned by workers in the prior art as employable in optional conjunction with various water-conserving compositions have included plant nutrient chemicals, or ie., fertilizers. Urea, ammonium nitrate, ammonium phosphate, and many other nutrient compounds of either organic or inorganic derivation are available in dry powdery forms, and certainly may if desired be packaged together with the powdery evaporation suppressant composition manufactured in accordance with my present invention—so long, that is, that the packaging and storing conditions permit no adverse chemical reactions, or other undesired consequences. Water of course has to be kept out of storage containers, and it is conceivable that certain combinations of fertilizer powders and the powder of my disclosed composition might result in a more hygroscopic mass of material than is desired. Investigation of such matters in the case of each extraneous substance contemplated to be brought into intimate contact with my disclosed composition is advised. Sand I know already from experiments to have no deleterious effect, and it seems a plausible inference that any fertilizer which is as inert in relation to my composition as is sand may be mixed with it.

Distinct from above contemplation of post-manufacture addition, to ready for storage quantities of my composition, of dry fertilizers easily ascertained to be storable therewith, is a prospect of modifying composition constituents and ratios, and processing conditions, so as to incorporate during melt processing with a sulfuric acid containing composition generally similar to my acidified gypsum based embodiment of the present invention any chemical fertilizer which would tend to react with sulfuric acid in the melt with higher fatty alcohol. Blending potassium chloride, for example, into a melt of higher fatty alcohol into which calcium sulfate and sulfuric acid are also blended would, in my opinion, especially because of expected tendency of producing gaseous hydrogen chloride, be to go well beyond the herein disclosed scope of subject matter essential to concise description of my present invention. Separate disclosure of specified constituent ratios and processing conditions to render so different a blend feasible to manufacture would appear appropriate under the heading of another invention.

For the present I confine what is sought as proprietary rights in the herein disclosed invention only to what reasonable interpretation of the claims to follow would delimit.

What I claim as new is:

1. An improved method of distributing an intimately blended mixture in quantities sufficient to suppress water evaporation, wherein the said mixture comprising an unemulsified detergent range alcohol comprising from 14 to 22 carbon atoms, calcium sulfate (gypsum) and sulfuric acid, wherein the said mixture is distributed to the surface layer of soil in an agricultural land for suppressing water evaporation fiom the surface layer of agricultural land without causing significant restriction in the rate of rain or irrigation water infiltration into and through the said surface layer of soil, said improvement comprises rapid spreading of the said intimately blended mixture in to the soil and elimination of modification of soil properties that occur with the application of calcium hydroxide.

2. The method of claim 1, wherein the said intimate mixture comprises a predetermined ratio of 1 part by weight of unemulsified detergent range alcohol and ten parts by weight of calcium sulfate and sulfuric acid weighed together, and the ratio of calcium sulfate to sulfuric acid is 300 grams to 5 milliliters.

3. A method of suppressing water evaporation from the surface layer of an agricultural soil and from an open water reservoir comprising distributing on the surface of the reservoir an intimately blended mixture comprising unemulsified detergent range alcohol having 14 to 22 carbon atoms, calcium sulfate and sulfuric acid, wherein the components of the mixture are in a ratio as defined in claim 2.

4. A method of preparing the intimate mixture of claim 1, consisting essentially the steps of
   (1) absorbing sulfuric acid into powdered calcium sulfate at a ratio of 5 ml sulfuric acid to every 300 grams of calcium sulfate, thereby making acidified gypsum;
   (2) melting said detergent range alcohol at a temperature from about 90° C. to about 120° C.;
   (3) intimately blending, a ratio of 1 parts by weight of molten detergent range alcohol from step (2) and 10 parts by weight of acidified gypsum from step (1);
   (4) cooling the intimately blended mixture of step (3) to about 30° C.;
   (5) crushing and sizing the cooled mixture of step (4) so as to obtain a powder aggregate comprising individual particles having size ranging from 10 microns to 300 microns.

5. A method of suppressing water evaporation from the surface layer of an agricultural soil and from an open water reservoir comprising distributing on the surface of the reservoir, an intimately blended mixture comprising unemulsified detergent range alcohol having 14 to 22 carbon atoms, calcium sulfate and sulfuric acid, wherein the preparation of said mixture involves the steps of claim 4.

\* \* \* \* \*